(12) United States Patent
Madsen (10) Patent No.: US 9,732,479 B2
(45) Date of Patent: Aug. 15, 2017

(54) ROLLING WHEEL DEFLECTOMETER (75) Inventor: Jakob Find Madsen, Glostrup (DK)

(73) Assignee: DYNATEST INTERNATIONAL A/S, Glostrup (DK)

( * ) Notice: Subject to any disclaimer, the term of this patent is extended or adjusted under 35 U.S.C. 154(b) by 256 days.

(21) Appl. No.: 14/407,167

(22) PCT Filed: Jun. 14, 2012

(86) PCT No.: PCT/DK2012/050204
§ 371 (c)(1),
(2), (4) Date: May 7, 2015

(87) PCT Pub. No.: WO2013/185759
PCT Pub. Date: Dec. 19, 2013

(65) Prior Publication Data
US 2015/0240431 A1    Aug. 27, 2015

(51) Int. Cl.
*E01C 23/01* (2006.01)
*G01B 11/16* (2006.01)
*G01B 11/25* (2006.01)
*G01M 5/00* (2006.01)

(52) U.S. Cl.
CPC ............. *E01C 23/01* (2013.01); *G01B 11/16* (2013.01); *G01B 11/167* (2013.01); *G01B 11/2518* (2013.01); *G01M 5/0091* (2013.01)

(58) Field of Classification Search
None
See application file for complete search history.

(56) References Cited

U.S. PATENT DOCUMENTS 4,571,695 A    2/1986 Elton et al.
4,781,058 A    11/1988 Arnberg
(Continued)

FOREIGN PATENT DOCUMENTS

CN    201615872 U    10/2010
RU    73884 U1    6/2008
WO    WO-2010072316 A1    7/2010
WO    WO-2013185759 A1    12/2013

OTHER PUBLICATIONS

Chinese Office Action and English translation thereof dated Sep. 21, 2015.
(Continued)

*Primary Examiner* — Andre Allen
(74) *Attorney, Agent, or Firm* — Harness, Dickey & Pierce, PLC (57) ABSTRACT

A method and an apparatus for rolling wheel deflection measurement are disclosed. The apparatus includes a rolling wheel to be moved along a measuring surface in a first direction; a frame extending essentially along the measuring surface in the first direction from at least the rolling wheel; four spaced apart range sensors; a scanner for scanning in a first time interval a number of lines using each of the range sensors, so as to get a corresponding number of virtual images, in which the pixel values represent distances; and a data processor adapted for comparing and matching the virtual images, so as to identify corresponding regions, and for calculating a deflection value using matched pixel values of virtual images from the virtual images based on the identification corresponding regions.

19 Claims, 3 Drawing Sheets

(56) References Cited

U.S. PATENT DOCUMENTS

| | | | |
|---|---|---|---|
| 5,510,889 A * | 4/1996 | Herr | G01B 11/24 356/2 |
| 5,753,808 A | 5/1998 | Johnson | |
| 5,790,243 A * | 8/1998 | Herr | G01B 11/24 356/2 |
| 6,542,249 B1 | 4/2003 | Kofman et al. | |
| 9,261,354 B1 * | 2/2016 | Mercado | G01B 11/24 |
| 2011/0259114 A1 * | 10/2011 | Ullidtz | G01C 7/04 73/784 |
| 2012/0010828 A1 * | 1/2012 | Ullidtz | G01B 21/08 702/42 |
| 2013/0283924 A1 * | 10/2013 | McCullough | G01N 3/00 73/786 |

OTHER PUBLICATIONS

Johnson, R.F. et al., "Rolling Weight Deflectometer with Thermal and Vibration Bending Compensation," Transportation Research Record, 1996.
English translation of Chinese Office Action mailed May 23, 2016.
Russian Office Action and English translation thereof mailed May 27, 2016.
International Search Report PCT/ISA/210 for International Application No. PCT/DK2012/050204 Dated Feb. 25, 2013.
Written Opinion of the International Searching Authority PCT/ISA/237 for International Application No. PCT/DK2012/050204 Dated Feb. 25, 2013.

* cited by examiner

New lines added here

ROLLING WHEEL DEFLECTOMETER

The present invention relates to method and an apparatus for rolling wheel deflection measurement.

Rolling wheel deflectometers are used for surveying pavements, such as roads or airport runways covered with concrete or asphalt, for faults and defects. A rolling wheel deflectometer comprises a heavy weight, e.g. 20,000 kg, supported by a wheel, which is rolled over the pavement at relatively high speed up to 100 km/h. The weight causes a localised deflection basin in the pavement around the wheel. The depth and shape of the deflection basin can be used as an indicator for defects and faults in the pavement, which need further investigation. Due to the high speed, the use of a rolling wheel deflectometer is an efficient way of surveying the pavement.

However, as explained in e.g. U.S. Pat. No. 5,753,808 or the article 'Rolling Weight Deflectometer with Thermal and Vibration Bending Compensation' Johnson, R. F. et al, TRANSPORTATION RESEARCH RECORD 1540, 1996, the deflection caused in the pavement is rather minute, e.g. in the magnitude of 100 micrometers to 2000 micrometers, compared to the general surface roughness of the pavement, and it is thus not an easy task to measure at 100 km/h. As explained in U.S. Pat. No. 5,753,808 the traditional rolling wheel deflectometer uses a number of distance sensors, e.g. four, arranged with equidistant spacing along a horizontal beam and measuring the distance downwardly to the pavement. One of the distance sensors is arranged above the point where the loaded wheel engages and deflects the pavement, whereas the others are arranged with equidistant spacing along the beam in front of the loaded wheel, as seen in the direction of motion. When comparing measuring data from all sensors in two subsequent situations, namely when the loaded wheel has moved exactly one distance sensor spacing, that is from a first position to a second position corresponding exactly to the position where the preceding distance sensor was when the loaded wheel was in the first position, the actual deflection caused can be calculated quite precisely, using a suitable algorithm, known as the Harr algorithm as explained in U.S. Pat. No. 5,753,808.

However, for the algorithm to yield a precise and useful result, the identification of the exact same position between the moved loaded wheel and the preceding distance detector, needs to be quite accurate. The same goes for the further preceding distance detectors and their respective predecessors in the direction of motion. This means that the odometer used for measuring the moved distance needs to be precise, to prevent measurements in front of or behind the second position, but also that the tracking needs to be precise in order to not measure left or right of second position, because the natural height of pavement in these neighbouring regions may differ far more than the height of deflection, which it is the intention to measure, and thus spoil any measurement.

U.S. Pat. No. 5,753,808 seeks to overcome this problem by measuring the distance to a relatively large spot such as an ellipse with main axis of 5 cm and 2.5 cm using a laser, thus averaging out variations within the illuminated area, The size of the spots also increases the likelihood that the ellipses of two subsequent measurement register with sufficient overlap to not adversely influence the measurement.

There is, however, still a desire to achieve more precise measurements than what can be achieved with the rolling wheel deflectometer of U.S. Pat. No. 5,753,808.

According to a first aspect of the present invention this object is achieved by a method for rolling wheel deflection measurement comprising, providing a rolling wheel to be moved along a measuring surface in a first direction, providing frame extending essentially along said measuring surface in said first direction from at least said rolling wheel, providing at least four spaced apart laser range sensors, a first of said range sensors being arranged at a location corresponding to said rolling wheel, and the remainder being arranged as first, second and third preceding range sensors, respectively, in front of said first range sensor in said first direction, scanning in a first time interval a number of lines on said measuring surface corresponding to the target area of each of said range sensors, so as to get a corresponding number of images, scanning in said first time interval a number of lines on said measuring surface using each of said range sensors, so as to get a corresponding number of virtual images, in which the pixel values represent distances, comparing and matching said images using a dataprocessing means, so as to identify corresponding regions, calculating a deflection value using matched pixel values of virtual images from said first and second sets of virtual images.

According to a second aspect of the present invention this object is achieved by an apparatus for rolling wheel deflection measurement comprising, a rolling wheel to be moved along a measuring surface in a first direction, a frame extending essentially along said measuring surface in said first direction from at least said rolling wheel, at least four spaced apart laser range sensors, a first of said range sensors being arranged at a location corresponding to said rolling wheel, and the remainder being arranged as first, second and third preceding range sensors, respectively, in front of said first range sensor in said first direction, means for scanning in a first time interval a number of lines using each of said range sensors, so as to get a corresponding number of virtual images, in which the pixel values represent distances, a data processing means adapted for comparing and matching said virtual images, so as to identify corresponding regions, and a data processing means adapted for calculating a deflection value using matched pixel values of virtual images from said virtual images based on said identification corresponding regions.

By comparing and matching the virtual images a very high accuracy in the measurement can be achieved because the calculation using the Harr algorithm may be made for each and every matched pixel and the average calculated subsequently to smooth out any possible errors, e.g. in the matching, CCD noise, moving foreign objects etc. Using the Harr algorithm on points i.e. pixels positively identified as the same location on the surface, evidently yields a better result that comparing average values over large areas, of which the degree of matching is not known. According to a first preferred embodiment, said images are said virtual images, and said virtual images are compared and matched in the data processing means, so as to identify the corresponding regions. Using the virtual images directly for the comparison ensures good identification of corresponding areas, and avoids the need for additional image capture equipment.

However, according to another embodiment, said images comprise light intensity values. Thereby, a further possibility of identifying corresponding areas of the pavement surface is given. Furthermore, using light intensity values instead of or in addition to the range information may improve the identification rate for the corresponding regions.

According to a further preferred embodiment, said images comprise light intensity values provided by the respective range sensors. This allows the use of range sensors with dual information output, thus obviating the need for further detectors.

According to another preferred embodiment, the comparing and matching is performed on pairs of images from the range sensors. This allows the calculation of the deflection using the Harr algorithm without having to wait until the last range sensor has passed the same position as the first range sensor, and moreover mitigates the risk that the last range sensor does pass over any point passed by the first range sensor, e.g. if the rolling wheel deflectometer is turning.

According yet another preferred embodiment, the region is identified by comparing and matching at least one image sector of 100×100 pixels or less preferably 25×25 pixels. This has been found sufficient, and yields a quick identification, which may be performed using a personal computer.

According to an further preferred embodiment the comparing and matching is performed by repeated calculation of correlation for varying values of $\Delta x$, $\Delta y$ and $\Delta \alpha$ for the region, where $\Delta x$ is a displacement in the direction of transport, $\Delta y$ is a lateral displacement across the direction and $\Delta \alpha$ is an angular deviation in orientation of the region in a first image recorded by a range sensor and a succeeding range sensor. This yields an efficient identification of the pixels for, which the Harr algorithm is to be applied, even if when they lie outside the identified region.

Thus this allows for a particularly preferred embodiment where the deflection value is repeatedly calculated line by line using the pixel values of one line at a time. Thus, for every new line added to the virtual image the deflection may be calculated over practically the entire scanned width.

According to another preferred embodiment, the deflection value is calculated as an average of individual deflection values of a number of matched pixels. By taking the average over a large number of matched calculated values the precision in the average becomes very high, and noise from e.g. the CCD cameras used is suppressed.

According to a further preferred embodiment, the resolution along the scanned line is at least 1000 pixels, preferably 2000 pixels or higher. This yields a sufficiently high resolution, while keeping the necessary computing power at reasonable level, where the calculations can be performed using a standard portable personal computer. Likewise the scanning with this resolution can be achieved using standard scanning products.

The present invention will now be described in greater detail based on non-limiting exemplary embodiments and with reference to the schematic drawings on which.

Figure 1:
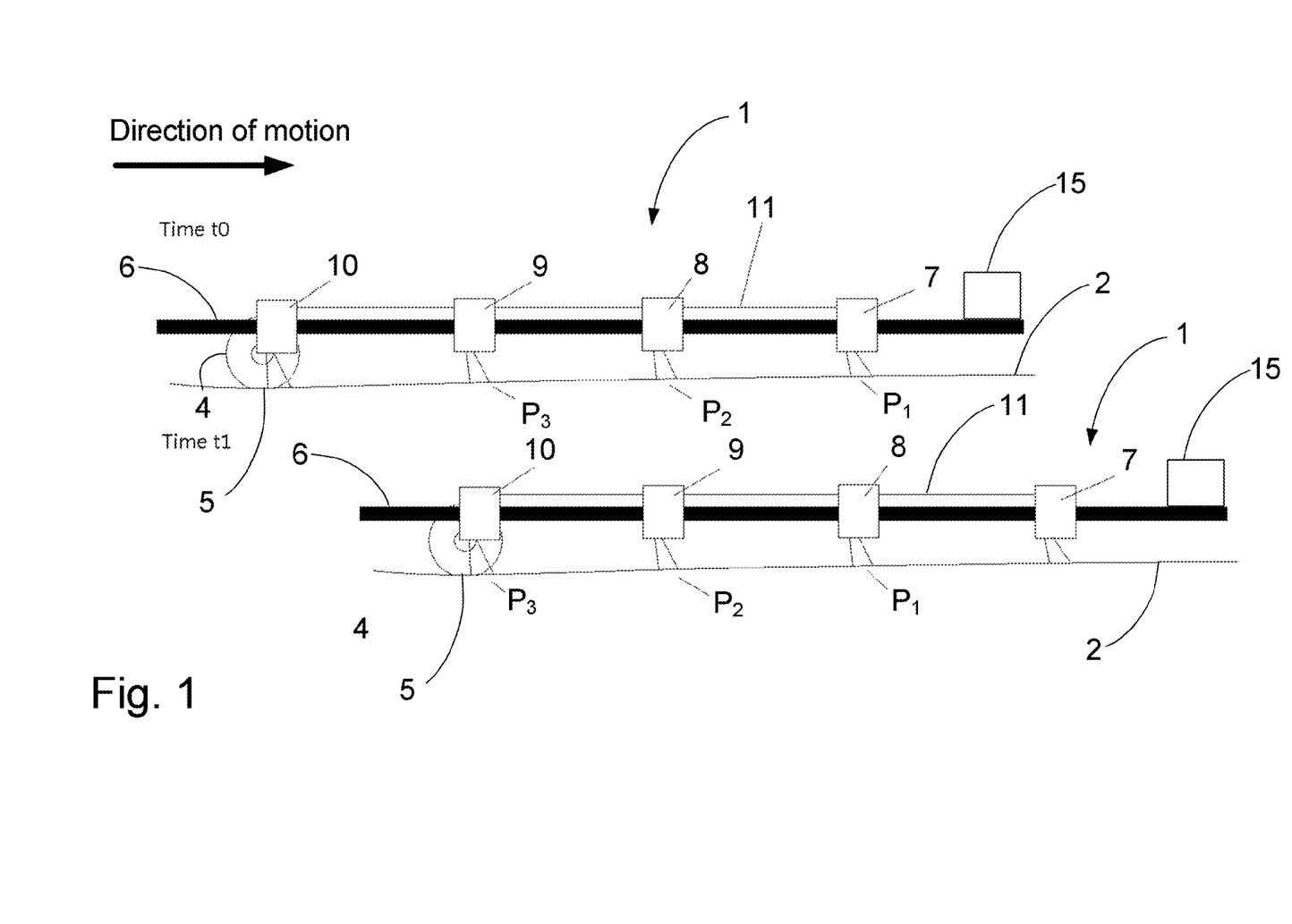
FIG. 1 schematically shows a rolling wheel deflectometer according to the invention in a two positions, corresponding to two different points in time and location.

The upper part of FIG. 1 schematically shows a rolling wheel deflectometer 1 according to the invention in a first position. The rolling wheel deflectometer 1 is adapted to be moved, typically towed, along a test surface 2 formed by the pavement to be surveyed in a first direction generally indicated with the arrow 3. The pavement could e.g. be a road or an airport runway covered with concrete or asphalt, which has to be surveyed for faults and defects. As the name suggests, the rolling wheel deflectometer comprises a weight acting on a load wheel 4. The load wheel 4 supporting is generally arranged at the trailing end of the rolling wheel deflectometer 1 as defined by the motion in the first direction 3. The load wheel 4 is weighed down a substantial mass so as to provide down force on the pavement of e.g. 50 kN, 100 kN or 200 kN. This down force creates a deflection basin 5 around the load wheel 4. For illustration purposes, the depth of the deflection in the deflection basin 5 around the load wheel has been exaggerated, both in the upper and lower part of in FIG. 1. The actual deflection is in fact only in the micrometer range, typically in the range from 100 micrometers to 2000 micrometers, whereas the typical overall length of the rolling wheel deflectometer 1 in the first direction would be between 10 m and 15 m.

Along the length of the rolling wheel deflectometer 1 runs a carrier in the form of an essentially horizontal beam 6. The beam carries a number of range sensors 7, 8, 9, 10 directed towards the test surface. Since the intention is to perform measurements in the micrometer range a laser alignment system 11 is used to keep track of variations the position of individual range sensors 7, 8, 9, 10 due to flexibility of the beam 6, variations in thermal expansion along the length thereof etc, as e.g. described in U.S. Pat. No. 5,753,808 incorporated herein by reference. The range sensors 7, 8, 9, 10 are preferably equidistant, i.e. with the same spacing between any two neighbouring range sensors 7, 8, 9, 10. Different spacing may also be used. Important is that the spacing is known, the range sensors 7, 8, 9 are located outside of the deflection basin 5 created at the range sensor 10.

The range sensors 7, 8, 9, 10 used in the present invention are preferably line scanners. In the description the range sensors 7, 8, 9, 10 will also be referred to as sensor A, sensor B, sensor C and sensor D, respectively, and corresponding letters will be used in indices and equations. Currently preferred is a Gocator 2340 line scanner, available from LMI Technologies, Inc. Line scanners of this type project a line onto the surface at an angle using a laser fanning out from a point source. When the surface is not smooth, the line projected onto it will not be straight but contain undulations depending on the local variations in the distance to the surface. The shape and position of the line is captured using a camera and the range to the surface is calculated from this shape and position. The overall length of the line will vary with more global variations in the distance to the surface, because the laser beam fans out from a point source. Hence, with a larger the global distance, the longer the illuminated line produced by the laser becomes. However, since the field of view of the CCD camera also varies, this effect is largely mitigated, and in the Gocator 2300 no additional normalization of the length is necessary.

In the present invention the individual sensors are arranged to scan lines along the surface in a direction across the direction of movement. Repeating this scanning at suitable small intervals triggered e.g. by a tacho linked to the load wheel 4. Thus consecutive line scans will be made forming a virtual image of the surface with a given resolution depending inter alia on the resolution of the camera recording the undulations on the line and on the frequency with which the scan is triggered. The image is referred to as virtual because the resulting pixel values do not represent actual visual image data but distances. The distances need not necessarily be the vertical elevation of the sensor over the measuring area for the specific point, but could be measured at an angle, thus rendering a value proportional with the elevation. Subsequent conversion is then just a matter of knowing the angle, and performing appropriate calculations. The rolling wheel deflectometer 1 further comprises dataprocessing means 15, possibly located in a towing vehicle.

Figure 2:
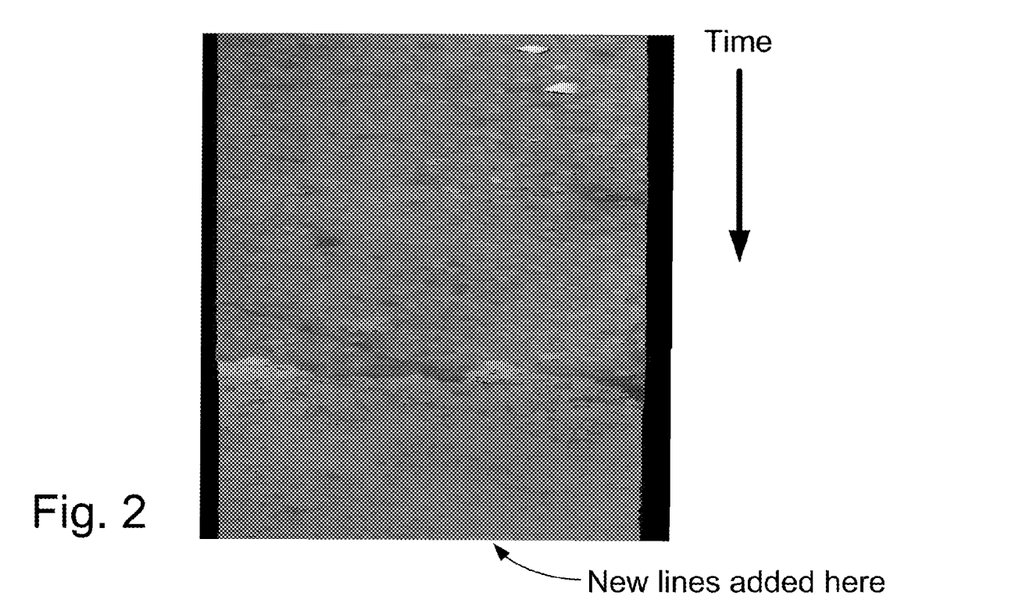
FIG. 2 is an example of virtual image recorded using one range sensor of the rolling wheel deflectometer.

FIG. 2 shows an example of such an image. The resolution is approximately 650×700 pixels including the dark area beyond either end of each of the scanned lines. The width of the pavement area scanned in FIG. 2 is approximately 10 cm whereas the length is several meters. The latter because the time delay between the instances where scans are triggered. In the illustrated example it would be 700 lines @ 5 mm corresponding to 3.5 m of actual pavement. FIG. 2 is only an illustration of the image. 3.5 m is less than practical for the invention, but as the skilled person will understand from the following, it would suffice if the spacing between the range detectors is less, e.g. 3 m. The length is in principle unlimited. In practice, however, the length would never exceed the length of the surveyed stretch of pavement. Data storage capacity could of course also limit the actual recorded length of pavement. Instead of such contiguous recording of the pavement by each sensor, each sensor could of course also record a number of consecutive virtual images of shorter length, to be individually compared, e.g. like the one in FIG. 2.

For each of the sensors a similar virtual image is recorded. Evidently the virtual images will not be entirely identical. Obviously, a line scanned by the sensor 10 located at load wheel 4, and thus measuring the distance to the bottom of the deflection basin 5 will yield longer distances and thus larger pixel values for corresponding pixels, than the line scanned by the other sensors 9, 8, and 7 when they passed over the same area and it was less depressed. Ideally, the sensors 7, 8, 9 is in this respect located so far ahead of the deflection basin and for far from the towing vehicle, that the pavement is not depressed—or at least can assumed to be not depressed. Moreover, since in practice the rolling wheel deflectometer 1 cannot be moved in an absolutely straight line, there may, even with the best timing, be deviations between the lines scanned by each of the sensors 7, 8, 9, 10 when they pass over what would ideally be the same point on the pavement. The scanned line may e.g. have a lateral off-set because the rolling wheel deflectometer 1 is turning at another radius than the towing vehicle, when the towing vehicle is not following a straight line, or otherwise not trailing the towing vehicle in a straight line. Moreover, turning may impose an angular component to the scanned line. Finally, there may also be an off-set in the direction of movement such that the timing of when scanned lines coincide is off, e.g. advancing or lagging the expected.

The present invention realises that despite these variations, the correlation between corresponding areas in the images is sufficient to allow these to be identified with a very high degree of certainty in the different images.

This is done by selecting a small initial target area in one image, such as the area 12 in the virtual image from range sensor A in FIG. 1. Small, in this respect, meaning less than approximately 100×100 pixels preferably 25×25 pixels. Evidently the target area needs not be a square (in terms of pixels). Basically it doesn't even need to be a rectangle. It has been found that with the given processing power this allows the corresponding area to be found in the other images. The initial target can be selected in any appropriate way, as soon as sufficient lines have been recorded. This could be done randomly, or simply by selecting a target left, right or centre of the image. If sufficient processing power is available, a pre-processing for analysing the image for distinctive features, which would be readily identifiable in another image, could be performed.

Having decided on a target area 12 in the virtual image from sensor A the same area 12' has to be identified in virtual image from sensor B. Since the virtual images are not momentary images but each of them a actually a line scan over time an identical target area does not exist in the virtual image of sensor B or the virtual images of sensors C and D for that sake.

Figure 4:
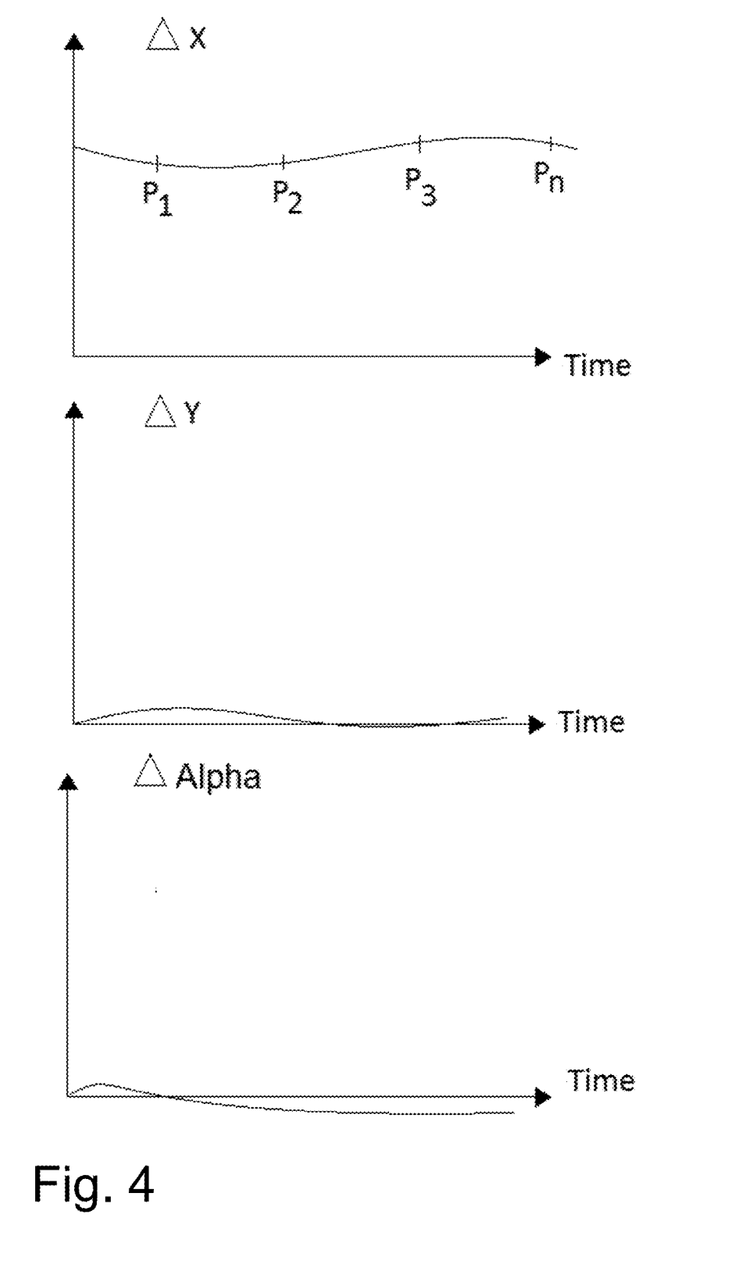
FIG. 4 is a schematic illustration in the variations over time in the transformation used to match pixels between a pair of virtual images.

The invention however realizes that the correlation is sufficient for the same area to be identified in two virtual images, thus yielding information allowing corresponding pixel values to be identified, which in turn allows the pixel information to be used directly in the Harr algorithm. More specifically, a transformation compensating for the deviations between the time during which the first virtual image from sensor A was recorded, and the time, during which the second virtual image was recorded, can be calculated. There are three parameters describing the transformation $T_{ab}$ between two images, the transform comprising the parameters $\Delta x_{ab}$, $\Delta y_{ab}$, and $\Delta \alpha_{ab}$. $\Delta x$ is the deviation along the x axis of the virtual image, which will largely correspond to the number of lines recorded between the undisturbed passages of sensor A and sensor B over the same point on the pavement, but include some deviation. $\Delta y$ is the lateral deviation, which should ideally be 0, if the rolling wheel deflectometer 1 is towed in a straight line. $\Delta \alpha$ is a rotational composant, which should also ideally be 0, if the rolling wheel deflectometer 1 is towed in a straight line. The index "ab" in the above and the following indicates that the transformation is from a virtual image recorded by range sensor A to a virtual image recorded by range sensor B. These deviations on $\Delta x$, $\Delta y$, and $\Delta \alpha$ will vary over time as illustrated in FIG. 4, for all transformations $T_{ab}$, $T_{bc}$, $T_{cd}$, and FIG. 4 may apply to any of them.

Figure 3:
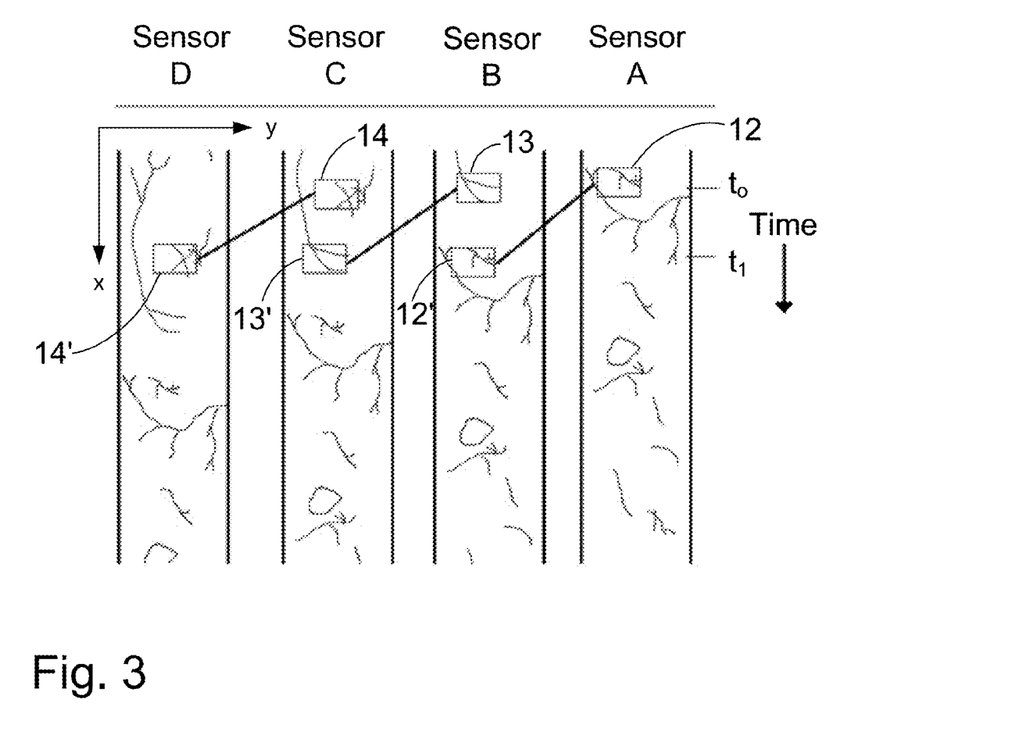
FIG. 3 is a schematic representation of four virtual images like the one in FIG. 2, recorded concurrently over time by four different range detectors.

As can be seen from FIG. 3 the corresponding correlation can be performed between a target area 13 in the virtual image from range sensor B and the corresponding area 13' in the virtual image from range sensor C, thus yielding a transform $T_{bc}$ with the parameters $\Delta x_{bc}$, $\Delta y_{bc}$, and $\Delta \alpha_{bc}$. It can then also be done for target area 14 in the virtual image from range sensor C and the corresponding area 14' in the virtual image from range sensor D, yielding a transform $T_{cd}$ with the parameters $\Delta x_{cd}$, $\Delta y_{cd}$, and $\Delta \alpha_{cd}$. If further range sensors are used, further transforms are derived in the same manner.

Experience shows that, having identified the transform it can safely be assumed that the transform is not only valid for the actually identified area, but largely applies to virtual image, at least in the vicinity of the target. Evidently, a number of lines corresponding at least to the distance between two range sensors have to be recorded initially before the transforms can be derived. After that, however, using the derived transforms allows the Harr algorithm to be applied to large data sets of individual pixel values, e.g. an entire line across the width of the recorded virtual image.

Generally the deflection using the Harr algorithm is given by:

$$\text{Deflection} = [(B(t_1) - 2C(t_1) + D(t_1)) - (A(t_0) - 2B(t_0) + C(t_0))]$$

where A, B, C and D are the distance values recorded by a the range sensor with the corresponding letter to the times $t_0$ or $t_1$.

If A, B, C and D are not discrete points, e.g. a scan line across the width of the virtual image, the pixel values are in vectors A, B, C and D. To match the individual pixels so as to use the Harr algorithm on identical points on the surface, the transforms must be used. The equation thus takes the form:

$$\text{Deflection} = [(T_{AB}B(t_1) - T_{ab}T_{bc}2C(t_1) + T_{ab}T_{bc}T_{cd}D(t_1)) - (A(t_0) - 2B(t_0) + T_{bc}C(t_0))]$$

Accordingly, the calculation can be done for a much larger area than the target area, e.g. the vectors above, or even larger sectors of the virtual images, i.e. comprising multiple lines. This means that average deflection value can be calculated with a much larger precision than in the prior art, where two average values were compared. Here an average of a large number of actual values are compared thus minimizing errors and noise. The calculation is preferably done on the fly by the data processing means 15, e.g, a portable personal computer forming part of the rolling wheel deflectometer 1, be it mounted on the frame 6 or the like thereof or located in a towing vehicle (not shown).

Preferably, however, not all values are compared. Values which are evidently out of range or otherwise incorrect may be filtered out before the calculation. Such errors are likely to occur because the virtual images of the same sector of pavement are not recorded at the same time. Thus changes may occur. Imagine e.g. a leaf whirling around under the rolling wheel deflectometer 1. Such a leaf would show up as very short ranges in a virtual image. Actually, the very same leaf could show up in different places in more of the recorded virtual images, or even in one and the same virtual image. It is therefore preferred to filter the values of the compared sectors of the virtual images using e.g. a median filter in order to suppress such strongly deviating values. It will be apparent to the skilled person, that other kinds of preprocessing of the data, in particular filtering, could also be used.

For the determining of correlation in order to determine the transforms several possibilities are available, e.g. such as fast annealing methods. The following method is preferred. This method may be performed by the same data processing means 15 as used for the Harr algorithm.

Initially a target area is selected in a virtual image. For the following description, the target area 12 in virtual image from range sensor A is used. The target size is preferably rather small compared to the virtual image, e.g. 100×100 pixels or smaller preferably 25×25 pixels, as compared to the width of the line scan of e.g. more than 1000 pixels or even more than 2000 pixels. The initial target area 12 may be chosen in various ways, e.g. simply by starting at the left or right margin or in the center of the virtual image, as soon as sufficient lines are available. A reference pixel in this target area 12 has a well defined position in terms of x, y and a, say (y, 1, 0). As soon as more lines than necessary are available, it would also be possible to vary the x position of the initial target area 12. A correlating image 12' has to be found in the virtual image from range sensor B. Obviously, as the lines are recorded using a tacho linked to motion of the rolling wheel deflectometer 1, the distance d between range sensor 7 and 8 in terms of number of lines is ideally known. Thus for seeking the corresponding area 12' in virtual image from range sensor B would be (y+d, 1, 0), thus assuming the rolling wheel deflectometer 1 is running along a straight line with no lateral off-set. This in turn corresponds to a transform $T_{ab} = (\Delta x_{ab}, \Delta y_{ab}, \Delta \alpha_{ab}) = (d, 1, 0)$.

Using Pearson's correlation, the correlation between the pixels of target area 12 and target area 12' can now be calculated, yielding a value between −1 and 1. 1 is a perfect correlation, which is unlikely to exist in this context, and −1 is entirely uncorrelated, i.e. a virtual image corresponding to a photo negative.

Since, evidently, the assumption of the rolling wheel deflectometer 1 running in a straight line without off-set only rarely holds true, $T_{ab} = (d, 1, 0)$ is hardly going to be the correct transform. Therefore, by repeatedly varying ($\Delta x_{ab}$, $\Delta y_{ab}$, $\Delta \alpha_{ab}$) in increments from the starting point until a maximum correlation is reached, and repeating this process until no further maxima can be found by incrementing $\Delta x_{ab}$, $\Delta y_{ab}$, $\Delta \alpha_{ab}$, a local maximum correlation has been found. If the correlation value for this local maximum correlation is sufficiently high, target area 12' is assumed to correspond to the initial target area 12. Accordingly the transform $T_{ab}$ is then known. The same method is then used for determining $T_{bc}$ and $T_{cd}$ using target areas 13, 13' and 14, 14', respectively, upon which the calculations using the Harr algorithm can be performed as described above. If not, there are two possibilities. One is to discard possibility of finding any correlation and hence not performing any measurement. The alternative, if sufficient computing power is available is to start the search for target area 12' in another place in the virtual image recorded by range sensor B, e.g. starting with a transform $T_{ab} = (d', 1, 0)$ or $T_{ab} = (d, y, 0)$, d' being a higher or lower value than the expected d value and y being a positive or negative deviation from 0 in the lateral direction.

If however the correlation algorithm is performed for each new added line, deviations on $\Delta x_{ab}$, $\Delta y_{ab}$, $\Delta \alpha_{ab}$ are likely to be small, as any substantial discontinuities in the curves of FIG. 4 are unlikely, for a vehicle with the mass and size of the rolling wheel deflectometer 1.

If less computer power is available, it may not be suitable to perform the correlation algorithm for each new line added. In that case, however, it turns out that the Harr algorithm may still be performed for each new line. Due to the lack of discontinuities on $\Delta x$, $\Delta y$, $\Delta \alpha$, using approximated values for $\Delta x$, $\Delta y$, $\Delta \alpha$ between two determinations will still yield sufficiently precise deflection measurements for the intermediate approximately matched lines.

As an alternative to calculating the above transform involving the angle simple displacement values could also be used. For this a set of displacement values $\Delta x$, $\Delta y$ could be derived and stored for each pixel in the first image recorded by sensor A. Tabulating these values in a look-up table would allow the counter part an identified pixel in the image recorded by sensor A to be found in the second image recorded by sensor B, by simply adding $\Delta x$, $\Delta y$ values from the table to the X,Y location of the given pixel in the imager recorded by sensor A. This is of course with the proviso that the pixel does not fall entirely outside the second image. If, when establishing the look-up table uncorrelated areas are found, e.g. corresponding to areas between $P_1$ and $P_2$ in FIG. 4, values for the pixels for these areas may be interpolated form the $\Delta x$, $\Delta y$ values of the surrounding areas for which correlations is known to exist. Table I below, exemplifies such a look-up table between a first image recorded by sensor A and the second image recorded by sensor B. Look-up tables for the displacements between other images, i.e. from the one recorded by sensor B to the one recorded by sensor C, or from the one recorded by sensor C to the one recorded by sensor D would be established and used correspondingly.

TABLE I

| | Δx, Δy, Lookup table A-B | | | | |
|---|---|---|---|---|---|
| X/Y | 1 | 2 | 3 | ... | N |
| 1 | (5000, 0) | (5000, 0) | (5000, 0) | ... | (5000, 0) |
| 2 | (4999, −1) | (4999, −1) | (4999, −1) | ... | (5001, −2) |
| 3 | (4999, −1) | (4999, −1) | (4999, −1) | ... | (5001, −2) |
| ... | ... | ... | ... | ... | ... |
| n | (4999, −1) | (4999, −1) | (4999, −1) | (5000, 0) | (5001, −2) |

As can be seen the values of Δx are quite large compared to the values of Δy. This is because the value of Δx includes the displacement between the sensors A and B, which as indicated above can be several meters. The values are merely examples the values for Δx will depend on the resolution of the tacho, i.e. the number of lines scanned between the passages of sensors A and B over corresponding areas of the measuring surface. The values of Δy are far smaller as the rolling wheel deflectometer 1 will typically follow a line where curvature is small, and ideally should be 0 if the rolling wheel deflectometer 1 is following a straight line. As can be seen the values of Δx, Δy indicate that the rolling wheel deflectometer 1 is taking slight curve. Table I intend to illustrate this situation, where sensor B is arriving slightly to early at one side whereas the other side is arriving slightly too late, as compared to what would be expected if the rolling wheel deflectometer was following straight line. Similar because of the turning the lines are at an angle and become shorter and somewhat off-set, resulting in a deviation on the values of Δy.

Other ways of quickly finding a correlating target area are well known to the skilled person.

In order to further improve the reliable detection of a corresponding target area, the present invention further realizes that in parallel with the correlation of range values in the virtual images above, a further correlation between the actual light intensities recorded in the lines. A pavement surface such as concrete or asphalt are not uniformly coloured, but vary in darkness, e.g. between the bitumen or concrete and the rocky filler. As an alternative the image could be therefore be a B/W intensity image, rather than the virtual image, The Gocator 2300 is capable of recording and outputting both range and intensity values for scanned pixels. In turn, this would yield an alternative correlation which could be used instead of or in addition to the correlation identified using the virtual image. Thus, if for some reason no correlation can be found using the virtual images, the intensity image could be used instead, or vice versa. Thus, redundancy of information is provided, and the likelihood of finding a good correlation increased.

Thus, for each target area the maximum correlation between light intensities could also be performed using the same seeking algorithms as described above and this information used to verify the identification. It could also replace the identification from other correlation, if for some reason the correlation between target areas in two virtual images fails.

Though the, invention has been described above with reference to specific embodiments the skilled person will be aware of numerous variants of these embodiments within the scope of the claims. In particular he will appreciate that other range sensors than the preferred Gocator can be used, that other methods for seeking correlating areas can be used and that various filtering and processing methods may be used to reduce noise, errors and the like.

The invention claimed is:

1. A method for rolling wheel deflection measurement, comprising:
    providing a rolling wheel to be moved along a measuring surface in a first direction;
    providing a frame extending essentially along said measuring surface in said first direction from at least said rolling wheel;
    providing at least four spaced apart laser range sensors, a first of said range sensors being arranged at a location corresponding to said rolling wheel, and the remainder being arranged as first, second and third preceding range sensors, respectively, in front of said first range sensor in said first direction;
    scanning in a first time interval a number of lines on said measuring surface corresponding to a target area of each of said range sensors, so as to get a corresponding number of images;
    scanning in said first time interval a number of lines on said measuring surface using each of said range sensors, so as to get a corresponding number of virtual images, in which pixel values represent distances;
    comparing and matching said images using a data processor, so as to identify corresponding regions; and
    calculating a deflection value using matched pixel values of virtual images from said virtual images based on said identification of corresponding regions.

2. A method according to claim 1, wherein said images are said virtual images, and said virtual images are compared and matched in the data processor, so as to identify the corresponding regions.

3. A method according to claim 2, wherein the comparing and matching is performed on pairs of images from the range sensors.

4. A method according to claim 3, wherein the comparing and matching is performed by repeated calculation of correlation for varying values of Δx, Δy and Δa for the region, where Δx is a displacement in the direction of transport, Δy is a lateral displacement across the direction and Δa is an angular deviation in orientation of the corresponding regions in a first image recorded by a range sensor and a succeeding range sensor.

5. A method according to claim 1, wherein said images comprise light intensity values.

6. A method according to claim 5, wherein said images comprise light intensity values provided by the respective range sensors.

7. A method according to claim 1, wherein the comparing and matching is performed on pairs of images from the range sensors.

8. A method according to claim 7, wherein the comparing and matching is performed by repeated calculation of correlation for varying values of Δx, Δy and Δa for the region, where Δx is a displacement in the direction of transport, Δy is a lateral displacement across the direction and Δa is an angular deviation in orientation of the region in a first image recorded by a range sensor and a succeeding range sensor.

9. A method according to claim 1, wherein the matching of said corresponding regions is identified by comparing and matching at least one image sector of 100×100 pixels or less.

10. A method according to claim 9, wherein the comparing and matching is performed by repeated calculation of correlation for varying values of Δx, Δy and Δa for the region, where Δx is a displacement in the direction of transport, Δy is a lateral displacement across the direction and Δa is an angular deviation in orientation of the corresponding regions in a first image recorded by a range sensor and a succeeding range sensor.

11. A method according to claim 9, wherein the matching of said corresponding region is identified by comparing and matching at least one image sector of 25×25 pixels.

12. A method according to claim 1, wherein the deflection value is repeatedly calculated line by line using the pixel values of one line at a time.

13. A method according to claim 1, wherein scanned resolution along a scanned line is at least 1000 pixels or higher.

14. A method according to claim 13, wherein a resolution along the scanned line is 2000 pixels or higher.

15. A method according to claim 13, wherein the resolution along the scanned line is at least 2000 pixels.

16. A method according to claim 1, wherein the deflection value is calculated as an average of individual deflection values of a number of matched pixels.

17. An apparatus for rolling wheel deflection measurement, comprising:
   a rolling wheel to be moved along a measuring surface in a first direction;
   a frame extending essentially along said measuring surface in said first direction from at least said rolling wheel;
   at least four spaced apart laser range sensors, a first of said range sensors being arranged at a location corresponding to said rolling wheel, and the remainder being arranged as first, second and third preceding range sensors, respectively, in front of said first range sensor in said first direction;
   a scanner configured to scan in a first time interval a number of lines using each of said range sensors, to get a corresponding number of virtual images, in which pixel values of the virtual images represent distances;
   at least one or more processors configured to
      compare and match said virtual images,
      identify corresponding regions between the virtual images; and
      calculate a deflection value using matched pixel values of virtual images from said virtual images based on said identification corresponding regions.

18. The apparatus for rolling wheel deflection measurement, as recited in claim 17,
   wherein the scanner comprises a camera.

19. The apparatus for rolling wheel deflection measurement, as recited in claim 18,
   wherein the camera comprises a CCD camera.

* * * * *